United States Patent
West

(10) Patent No.: US 6,665,777 B2
(45) Date of Patent: Dec. 16, 2003

(54) METHOD, APPARATUS, NETWORK, AND KIT FOR MULTIPLE BLOCK SEQUENTIAL MEMORY MANAGEMENT

(75) Inventor: Karlon K. West, Austin, TX (US)

(73) Assignee: TNS Holdings, Inc., Austin, TX (US)

( * ) Notice: Subject to any disclaimer, the term of this patent is extended or adjusted under 35 U.S.C. 154(b) by 0 days.

(21) Appl. No.: 09/912,834

(22) Filed: Jul. 25, 2001

(65) Prior Publication Data

US 2002/0029800 A1 Mar. 14, 2002

Related U.S. Application Data

(60) Provisional application No. 60/220,974, filed on Jul. 26, 2000, and provisional application No. 60/220,748, filed on Jul. 26, 2000.

(51) Int. Cl.$^7$ .............................................. G06F 12/00
(52) U.S. Cl. ........................ 711/147; 711/151; 711/153; 711/163; 711/167; 711/173; 710/40; 710/200
(58) Field of Search .................................. 711/120, 121, 711/129, 130, 147, 153, 170, 171, 172, 173, 151, 167, 163; 710/200, 40

(56) References Cited

U.S. PATENT DOCUMENTS

| | | | |
|---|---|---|---|
| 4,486,834 A | | 12/1984 | Kobayashi et al. ......... 711/148 |
| 5,566,321 A | * | 10/1996 | Pase et al. .................. 711/153 |
| 5,568,609 A | | 10/1996 | Sugiyama et al. ............ 714/43 |
| 5,604,882 A | | 2/1997 | Hoover et al. ............... 711/121 |
| 5,737,509 A | * | 4/1998 | Fushimi et al. ................ 714/5 |
| 5,765,157 A | | 6/1998 | Lindholm et al. .......... 707/101 |
| 5,946,710 A | * | 8/1999 | Bauman et al. ............. 711/129 |
| 6,026,401 A | * | 2/2000 | Brealey et al. ................. 707/8 |
| 6,026,474 A | * | 2/2000 | Carter et al. ................ 711/202 |
| 6,070,194 A | * | 5/2000 | Yu et al. ..................... 709/229 |
| 6,125,401 A | * | 9/2000 | Huras et al. ................ 709/310 |
| 6,157,989 A | * | 12/2000 | Collins et al. .............. 711/151 |
| 6,360,303 B1 | * | 3/2002 | Wisler et al. ................ 711/152 |
| 6,427,195 B1 | | 7/2002 | McGowen et al. .......... 711/153 |
| 2003/0061395 A1 | * | 3/2003 | Kinsbury et al. ............ 709/312 |

FOREIGN PATENT DOCUMENTS

| | | |
|---|---|---|
| EP | 0 602 791 A2 | 6/1994 |
| EP | 0 917 056 | 5/1999 |
| WO | WO99/17196 | 4/1999 |
| WO | WO00/36509 | 6/2000 |

OTHER PUBLICATIONS

International Search Report dated Jul. 16, 2002.
International Search Report dated Jun. 5, 2002.
Bershad, et al., "The Midway Distributed Shared Memory System" Compcon Digest of Papers, pp. 528–537, Feb. 22, 1993.
Wilson, et al. "Hardware Assist for Distributed Shared Memory" Proceedings of the International Conference on Distributed Computing Systems, pp. 246–255, May 25, 1993.
Songnian, et al. "Heterogeneous Distributed Shared Memory," IEEE Transactions on Parallel and Distributed Systems, vol. 3, No. 5, pp. 540–554, Sep. 1, 1992.
Nitzbert, et al. "Distributed Shared Memory: A Survey of Issues and Algorithms," IEEE Computer Society, pp. 52–60, Aug. 1, 1991.

(List continued on next page.)

*Primary Examiner*—Donald Sparks
*Assistant Examiner*—Jasmine Song
(74) *Attorney, Agent, or Firm*—Gray Cary Ware & Freidenrich, LLP

(57) ABSTRACT

Systems and methods are described for multiple block sequential memory management. A method includes: partitioning a block of memory into a plurality of shared memory segments; and providing a processor with accessibility to each of the plurality of shared memory segments. An apparatus includes: a computer system; a block of memory including a plurality of shared memory segments; and a processor.

17 Claims, 3 Drawing Sheets

OTHER PUBLICATIONS

Stumm, et al. "Algorithms Implementing Distributed Shared Memory," IEEE Computer Society, pp. 54–64, May 1, 1990.

Ananthanarayanan, et al. "Experiences in Integrating Distributed Shared Memory with Virtual Memory Management," Operating Systems Review, vol. 26, No. 3, pp. 4–26, Jul. 1, 1992.

Bisiani, et al., "PLUS: A Distributed Shared–Memory System," Proceedings of the Annual International Symposium on Computer Architecture, pp. 115–124, May 28, 1990.

Levelt, "A Comparison of Two Paradigms for Distributed Shared Memory," Software Practice & Experience, vol. 22, No. 11, pp. 985–1010, Nov. 1, 1992.

Ramachandran, et al. "Programming with Distributed Shared Memory," Proceedings of the Annual International Computer Software and Applications Conference, vol. Conf. 13, pp. 176–183, Sep. 20, 1989.

Liviu Iftode et al., "Scope Consistency: A Bridge between Release Consistency and Entry Consistency," Symposium on Parallel Algorithms and Architectures, New York, IEEE, US, vol. SYMP. 8, Jun. 24, 1996, pp. 277–287.

Cattaneo, "Another C Threads Library," ACM Sigplan Notices, Association for Computing Machinery, New York, US, vol. 27, No. 12, Dec. 1, 1992, pp. 81–90.

Bolosky et al., "Simple but Effective Techniques for NUMA Memory Management," Operating Systems Review (SIGOPS), ACM Headquarter, New York, vol. 23, No. 5, 1989, pp. 19–31.

International Search Report dated Apr. 23, 2002.

International Search Report for PCT/US02/23171 dated Mar. 3, 2003.

\* cited by examiner

METHOD, APPARATUS, NETWORK, AND KIT FOR MULTIPLE BLOCK SEQUENTIAL MEMORY MANAGEMENT

CROSS-REFERENCES TO RELATED APPLICATIONS

This application is a continuation-in-part of, and claims a benefit of priority under 35 U.S.C. 119(e) and/or 35 U.S.C. 120 from, copending U.S. Ser. No. 60/220,974, filed Jul. 26, 2000, and No. 60/220,748, filed Jul. 26, 2000, the entire contents of both of which are hereby expressly incorporated by reference for all purposes.

BACKGROUND OF THE INVENTION

1. Field of the Invention

The invention relates generally to the field of computer systems. More particularly, the invention relates to computer systems where one or more central processing units (CPUs) are connected to one or more memory (RAM) subsystems, or portions thereof.

2. Discussion of the Related Art

In a typical computing system, every CPU can access all of the RAM, either directly with Load and Store instructions, or indirectly, such as with a message passing scheme.

When more than one CPU can access for manage the RAM subsystem or a portion thereof, certain accesses to that RAM, specifically allocation and deallocation of RAM for use by the Operating System or some application, must be synchronized to ensure mutually exclusive access to those data structures tracking memory allocation and deallocation by no more than one CPU at a time.

This technology, in turn, generates contention for those data structures by multiple CPUs and thereby reduces overall system performance. What is required is a solution that increases system performance by reducing contention for those data structures by multiple CPUs.

Heretofore, the requirements of reducing contention for those data structures by multiple CPUs and increasing system performance referred to above have not been fully met. What is needed is a solution that addresses these requirements.

SUMMARY OF THE INVENTION

There is a need for the following embodiments. Of course, the invention is not limited to these embodiments.

According to a first aspect of the invention, a method comprises: partitioning a block of memory into a plurality of shared memory segments; and providing a processor with accessibility to each of the plurality of shared memory segments. According to a second aspect of the invention, an apparatus comprises: a computer system; a block of memory including a plurality of shared memory segments; and a processor.

These, and other, embodiments of the invention will be better appreciated and understood when considered in conjunction with the following description and the accompanying drawings. It should be understood, however, that the following description, while indicating various embodiments of the invention and numerous specific details thereof, is given by way of illustration and not of limitation. Many substitutions, modifications, additions and/or rearrangements may be made within the scope of the invention without departing from the spirit thereof, and the invention includes all such substitutions, modifications, additions and/or rearrangements.

BRIEF DESCRIPTION OF THE DRAWINGS

The drawings accompanying and forming part of this specification are included to depict certain aspects of the invention. A clearer conception of the invention, and of the components and operation of systems provided with the invention, will become more readily apparent by referring to the exemplary, and therefore nonlimiting, embodiments illustrated in the drawings, wherein like reference numerals (if they occur in more than one view) designate the same elements. The invention may be better understood by reference to one or more of these drawings in combination with the description presented herein. It should be noted that the features illustrated in the drawings are not necessarily drawn to scale.

DESCRIPTION OF PREFERRED EMBODIMENTS

Figure 1:
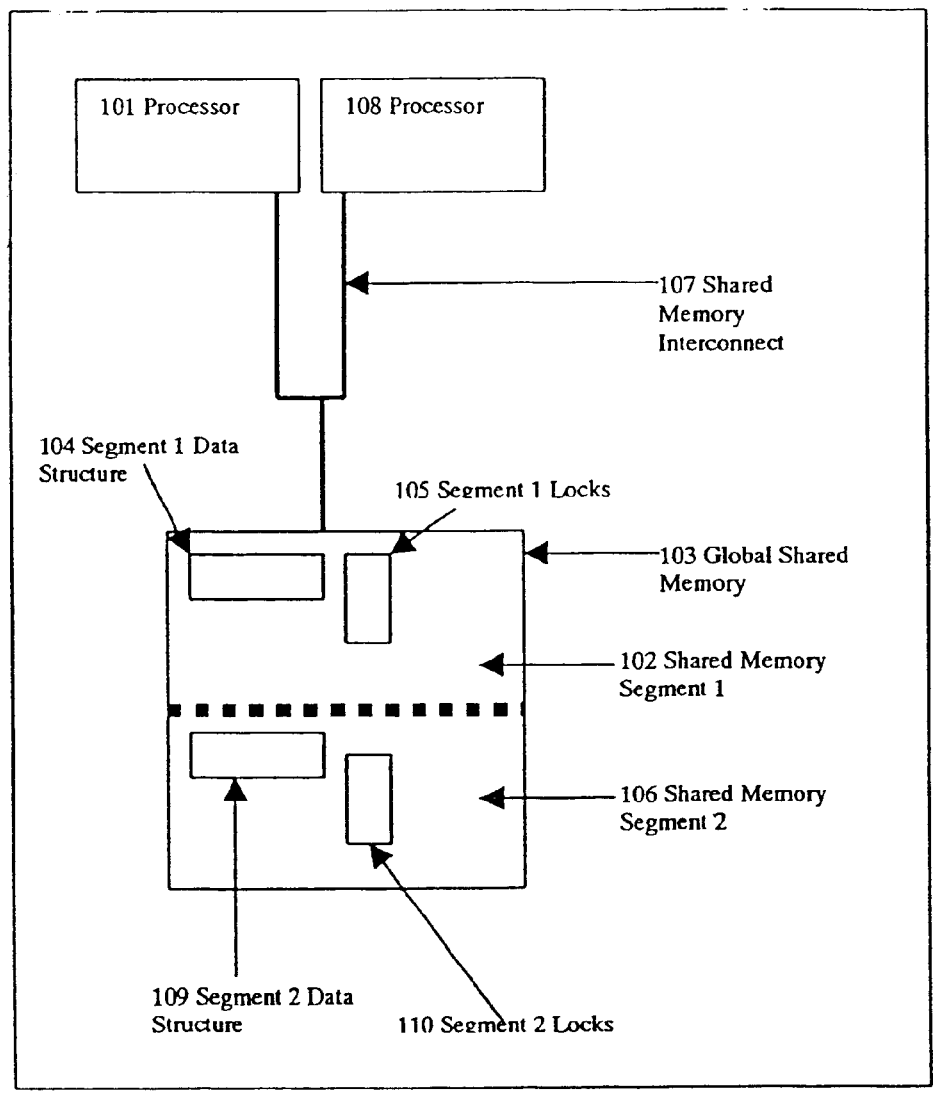
FIG. 1 illustrates a block diagram of a computer system representing an embodiment of the invention.

The invention and the various features and advantageous details thereof are explained more fully with reference to the nonlimiting embodiments that are illustrated in the accompanying drawings and detailed in the following description. Descriptions of well known components and processing techniques are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this detailed description.

The below-referenced U.S. Patent Applications disclose embodiments that were satisfactory for purposes for which they are intended. The entire contents of U.S. Ser. Nos. 09/273,430, filed Mar. 19, 1999; 09/859,193 filed May 15, 2001; 09/854,351, filed May 10, 2001; 09/672,909, filed Sep. 28, 2000; 09/653,189, filed Aug. 31, 2000; 09/652,815, filed Aug. 31, 2000; 09/653,183, filed Aug. 31, 2000; 09/653,425, filed Aug. 31, 2000; 09/653,421, filed Aug. 31, 2000; 09/653,557, filed Aug. 31, 2000; 09/653,475, filed Aug. 31, 2000; 09/653,429, filed Aug. 31, 2000; 09/653,502, filed Aug. 31, 2000; 09/912,954, filed Jul. 25, 2001; 09/012,872, filed Jul. 25, 2001; 09/915,109, filed Jul. 25, 2001; 09/912,856, filed Jul. 25, 2001; 09/915,001, filed Jul. 25, 2001; 09/912,870, filed Jul. 25, 2001; 09/912,898, filed Jul. 25, 2001; and 09/912,833, filed Jul. 25, 2001, are hereby expressly incorporated by reference herein for all purposes.

In a computing system for which the memory (RAM) subsystem or a portion of the RAM subsystem is connected to one or more central processing units (CPU) a technique is taught for reducing RAM subsystem contention and methods to efficiently and correctly process memory allocation and deallocation from the RAM subsystem.

In a computing system where more than one CPU has access to the RAM subsystem, or portions thereof, some methods of providing mutually exclusive access to the data structures used to track memory allocation and deallocation among the multiple CPUs must be provided. Traditionally, this is done with spinlocks, Test-And-Set registers, or bus locking mechanisms. In any of these scenarios, while a CPU is manipulating these specific data structures and another CPU needs to manipulate these data structures, the other CPU(s) must wait until the first CPU is finished, thus keeping the other CPUs from performing other work and thereby reducing the performance of the overall system.

In a computing system where each CPU has shared access to the RAM subsystem or a portion thereof, a methodology can be designed where more than one CPU can access the memory management data structures simultaneously while reducing contention for those data structures and, thus, increasing overall system performance.

Scardamalia et al [U.S. Ser. No. 09/273,430, filed Mar. 19, 1999 ] have described a system in which each computer node has its own private memory, but in which there is also provided a shared global memory accessible by all computer nodes. In this case, contention for shared memory data structures only occurs when more than one node is attempting to allocate or deallocate some shared memory at the same time. It is possible in a traditional symmetric multi-processor (SMP) where all memory is shared among all CPU that the techniques described by this invention will also apply. It is also obvious to one skilled in the art that other distributed, shared computer systems, including but not limited to cc-NUMA, benefit from the techniques taught herein.

A computer system of the type described in U.S. Ser. No. 09/273,430, filed Mar. 19, 1999 can be designed with each CPU able to allocate or reserve, and deallocate or release global shared memory for its use. The data structures describing the usable shared memory may reside in shared memory, though that is not necessary. The key concept of this invention is that the sum total of shared memory can be partitioned into two or more non-overlapping memory segments, each segment utilizing its own data structures used for managing shared memory allocation and deallocation, such that more than on CPU can allocate or deallocate shared memory simultaneously without introducing mutual exclusion, thereby reducing RAM contention and increasing overall system performance. When a CPU allocates or deallocates shared memory, some form of inter-CPU synchronization for purposes of mutual exclusion must be used to maintain the integrity of the data structures involved. However, if there are two or more sets of data structures managing different segments of memory, then access to all sets of memory segment data structures can be performed in parallel. FIG. 1 shows an example of such a computer system, with multiple CPUs, where global shared memory has been partitioned into two memory segments, and where the data structures for managing each shared memory segment as well as the synchronization primitives required for the management may be located in such system. However, the means described by this disclosure equally apply to computer systems where the data structures used to manage multiple shared memory segments and/or the synchronization primitives are not located in global shared memory. Referring to FIG. 1, a computer system is depicted. Element 101 is a standard CPU. This figure represents a two CPU computer system, namely elements 101 and 108, but it is obvious to one skilled in that art that this figure can contain many more than just two CPUs. Element 108 is also a standard CPU.

Element 103 is the global shared memory that is accessible, and accessed, by a plurality of CPUs. Even though this invention applies to single CPU computer systems, the benefits of this invention are not realized in such a configuration since the contention for memory by more than one CPU never occurs.

It is possible to extend the techniques taught by this invention down to the process level, or even thread level, where a given process or thread may deterministically allocate or release shared memory from multiple memory segments in such a way as to reduce inter-process or inter-thread contention of the memory management data structures where the processes or threads are running on a single CPU system or on a multiple CPU system.

Element 102 is one of the shared memory segments, and element 106 is the other memory segment as described in this example. It is obvious to one skilled in the art that this figure may contain many more than two memory segments, each with its own data structures and synchronization primitives. The memory segments may be identical in size, but that is not required. An alternative enhancement to this technique is to have differently sized memory segments, such that memory allocations of a given size determine which memory segment to utilize, reducing not only memory contention, but also reducing the occurrence of memory fragmentation.

Element 104 shows that the data structures for managing the allocation and deallocation in this computer system for memory segment 1 are actually located in the memory segment 1. However, it is obvious to one skilled in the art that the data structures used to manage allocation and deallocation from the different global shared memory segments may be located in any memory area of a single CPU or even distributed and synchronized across a plurality of CPUs. Element 109 is the data structure for memory segment 2.

Element 105 shows the synchronization mechanism used in this computer system for enforcing mutually exclusive access to the data structures used to manage shared memory segment 1 allocation and deallocations is a set of one or more locks, located in the global shared segment 1, accessible to all CPUs. It is obvious to one skilled in the art that the synchronization mechanism may be implemented using a bus locking mechanism on element 107, a token passing scheme used to coordinate access to the shared data structures among the different CPUs, or any of a number of different synchronization techniques. This invention does not depend on the synchronization technique used, but it is more easily described while referencing a give technique. Element 110 shows the location of the locks used to synchronize allocation and deallocation from memory segment 2.

Figure 2:
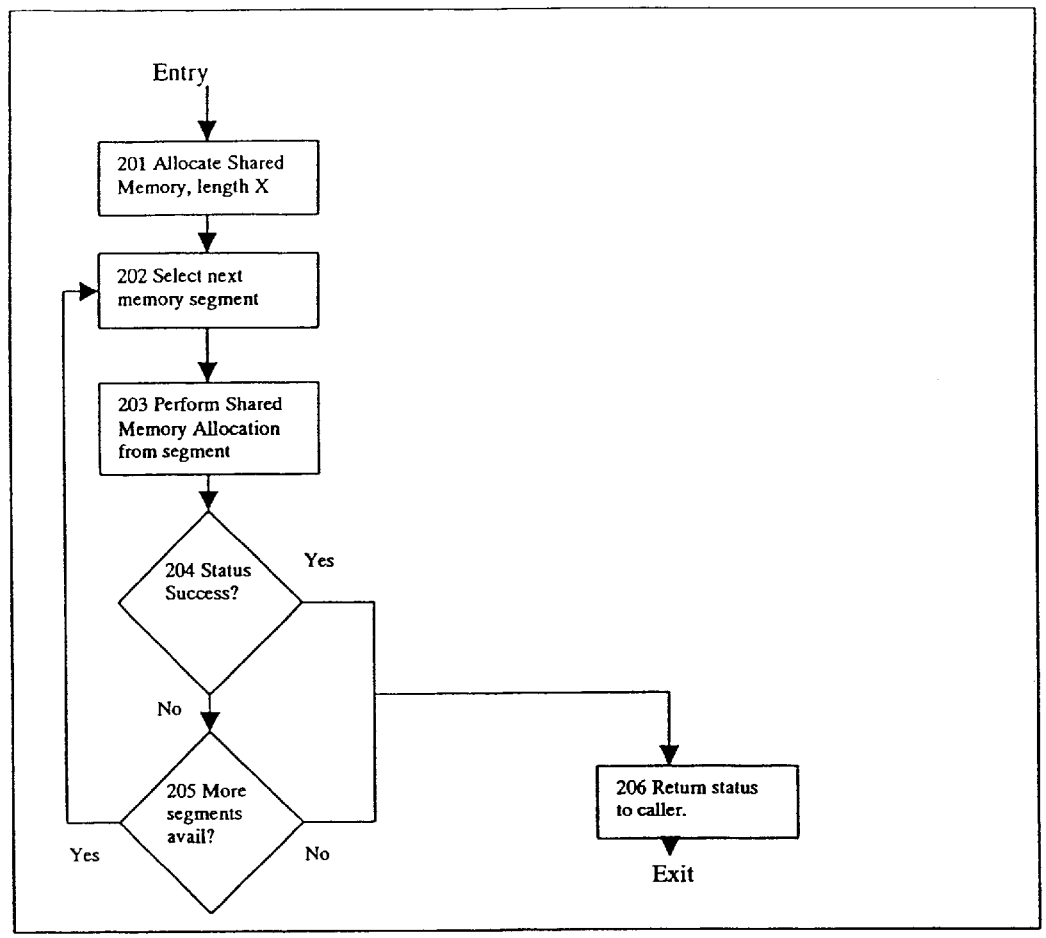
FIG. 2 illustrates a flowchart diagram of a process that can be implemented by a computer program, representing an embodiment of the invention.

Referring to FIG. 2, a decision flow of an application attempting to allocate global shared memory is depicted. Element 201 is the actual function call the application makes. There are various and sundry parameters associated with the call, but, for the purposes of this invention, the parameters values themselves are not relevant. However, it is obvious to one skilled in the art that numerous methods for determining which segment to attempt an allocation from may be based on the characteristics of one or more of the parameter values. These characteristics include, but are not limited to, exclusive versus shared use, cached versus non-cached shared memory, memory ownership flags, length, etc.

Element 202 implements the selection of available memory segments. A simplistic solution uses a distributed round-robin scheme, such that any memory allocation from a given CPU selects the next memory segment in a circular fashion from the memory segment last used by that CPU. While this scheme reduces contention for the shared memory data structures, it is likely that multiple CPUs will still try to access the same memory segment at any given time, limiting the effectiveness of this method. A better solution implements a shared round-robin scheme, such that every CPU accesses the same circular index used to determine which memory segment to allocate from the same memory segment at the same time.

Figure 3:
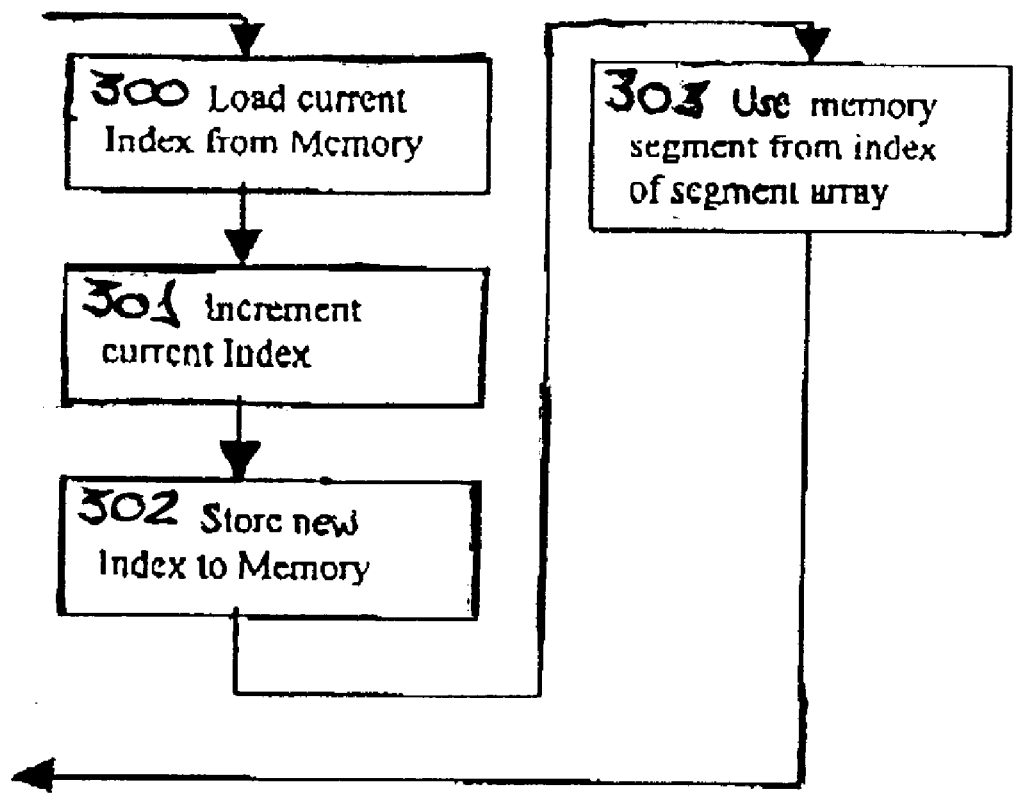
FIG. 3 illustrates a flowchart diagram of a shared Round-Robin memory segment selection scheme, representing an embodiment of the invention.

Referring to FIG. 3, a Shared Round-Robin memory segment selection scheme is depicted. In such scheme, each processor can keep an ordered array of the available shared memory segments, dynamically updated whenever any processor performs memory allocation. Element 300 reads a well-known location stored in shared memory that contains the current shared memory segment array index. Element 301 increments the current index value to a new index value for the next future shared memory allocation. Element 302 returns the segment at the index that was just modified. Finally, the allocation is from the index that was selected. In this manner, each processor that is performing shared memory allocations will use a different shared memory segment from the last shared memory allocation.

It is obvious to one skilled in the art that there are many more memory selection schemes than the ones mentioned here, including but not limited to: (i) selecting memory segments based on a unique CPU identification, providing a set associative scheme for allocating memory; (ii) selecting memory segments based on allocation length, also giving a set associated scheme with reduction in memory fragmentation; and (iii) selecting memory segments based on a hashing algorithm, randomly choosing the next memory segment, reducing system overhead in the selection process.

Element 203 is just the normal shared memory allocation procedure, which may include all of the synchronization and potential contention described above, but based on a given memory segment. The intent of this invention is to satisfy as many shared memory allocation requests by different memory segments simultaneously thereby reducing contention as much as possible. If in fact no simultaneous shared memory allocation request is ever satisfied by element 203, then a negligible amount of system overhead, and no additional contention is introduced by this invention. Therefore, in a worst case scenario, overall system performance is basically unaffected, but with a best case possibility of reducing shared memory data structure contention to almost zero.

Element 204 is a decision of whether the shared memory allocation from the selected segment succeeded or not. If the allocation succeeded, control is transferred to element 206, and the shared memory address is returned to the caller. If the allocation failed, control is given to the decision in element 205.

Element 205 is a decision of whether all memory segments have been tried yet, or if there are still some available memory segments left. If there are one or more memory segments left, then control is returned back to element 302, and another attempt to allocate shared memory is made. If all memory segments have been tried with no success, then control is transferred to element 206, and the calling function is notified of status failure.

It is obvious to one skilled in the art that certain enhancements of the data flow described in FIG. 2 are possible, including: (i) dynamically adjusting the memory segment boundaries; (ii) dynamically increasing or decreasing the number of available memory segments; (iii) merging memory segments when multiple segments were tried in an attempt to allocate shared memory with not success, and etc.

The context of the invention can include computer systems. The context of the invention can also include computer systems for which the RAM subsystem or a portion thereof is connected to one or more CPUs.

The invention can also be included in a kit. The kit can include some, or all, of the components that compose the invention. The kit can be an in-the-field retrofit kit to improve existing systems that are capable of incorporating the invention. The kit can include software, firmware and/or hardware for carrying out the invention. The kit can also contain instructions for practicing the invention. Unless otherwise specified, the components, software, firmware, hardware and/or instructions of the kit can be the same as those used in the invention.

The term approximately, as used herein, is defined as at least close to a given value (e.g., preferably within 10% of, more preferably within 1% of, and most preferably within 0.1% of). The term substantially, as used herein, is defined as at least approaching a given state (e.g., preferably within 10% of, more preferably within 1% of, and most preferably within 0.1% of). The term coupled, as used herein, is defined as connected, although not necessarily directly, and not necessarily mechanically. The term deploying, as used herein, is defined as designing, building, shipping, installing and/or operating. The term means, as used herein, is defined as hardware, firmware and/or software for achieving a result. The term program or phrase computer program, as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system. The terms including and/or having, as used herein, are defined as comprising (i.e., open language). The terms a or an, as used herein, are defined as one or more than one. The term another, as used herein, is defined as at least a second or more.

Practical Applications of the Invention

A practical application of the invention that has value within the technological arts is improving system performance in an environment where there are multiple computer nodes, each with one or more CPUs, where there are one or more shared RAM units which are accessible by some or all of the compute nodes. There are virtually innumerable uses for the invention, all of which need not be detailed here.

Advantages of the Invention

A multiple block sequential memory management technique, representing an embodiment of the invention, can be cost effective and advantageous for at least the following reasons. The invention improves quality and/or reduces costs compared to previous approaches.

All the disclosed embodiments of the invention disclosed herein can be made and used without undue experimentation in light of the disclosure. Although the best mode of carrying out the invention contemplated by the inventor(s) is disclosed, practice of the invention is not limited thereto. Accordingly, it will be appreciated by those skilled in the art that the invention may be practiced otherwise than as specifically described herein.

Further, the individual components need not be formed in the disclosed shapes, or combined in the disclosed configurations, but could be provided in virtually any shapes, and/or combined in virtually any configuration. Further, the individual components need not be fabricated from the disclosed materials, but could be fabricated from virtually any suitable materials.

Further, variation may be made in the steps or in the sequence of steps composing methods described herein.

Further, although the multiple block sequential memory management technique described herein can be a separate module, it will be manifest that the multiple block sequential memory management technique may be integrated into the system with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various substitutions, modifications, additions and/or rearrangements of the features of the invention may be made without deviating from the spirit and/or scope of the underlying inventive concept. It is deemed that the spirit and/or scope of the underlying inventive concept as defined by the appended claims and their equivalents cover all such substitutions, modifications, additions and/or rearrangements.

The appended claims are not to be interpreted as including means-plus-function limitations, unless such a limitation is explicitly recited in a given claim using the phrase(s) "means for" and/or "step for." Subgeneric embodiments of the invention are delineated by the appended independent claims and their equivalents. Specific embodiments of the invention are differentiated by the appended dependent claims and their equivalents.

What is claimed is:

1. A method, comprising:
   in response to a first function call operating on a first processor, allocating a first memory segment within a shared memory to the first processor, wherein the shared memory includes a plurality of memory segments including the first memory segment;
   providing the first processor with accessibility to the first memory segment;
   in response to a second function call operating on a second processor, allocating a second memory segment within a remaining portion of the shared memory to the second processor;
   providing the second processor with accessibility to the second memory segment;
   in response to a third function call operating on a first processor, allocating a third memory segment within the remaining portion of the shared memory to the first processor; and
   providing the first processor with accessibility to the third memory segment,
   wherein the second function call is made between the first function call and the third function call.

2. The method of claim 1, further comprising providing another processor with accessibility to each of the plurality of memory segments.

3. The method of claim 1, wherein accessibility to each of the plurality of memory segments includes accessibility to a plurality of shared memory management data structures.

4. The method of claim 3, further comprising sub-partitioning the plurality of shared memory management data structures.

5. The method of claim 1, wherein accessibility to the plurality of memory segments includes accessibility to a plurality of shared memory lock structures.

6. The method of claim 5, further comprising sub-partitioning the plurality of shared memory lock structures.

7. The method of claim 1, wherein accessibility includes mutually exclusive accessibility during a period of time.

8. The method of claim 7, wherein mutually exclusive accessibility is achieved by utilization of a synchronization technique.

9. The method of claim 8, wherein the synchronization technique includes at least one synchronization technique selected from the group consisting of: spin locking, bus locking and token passing.

10. The method of claim 1, wherein accessibility includes accessibility utilizing a shared memory segment selection technique.

11. The method of claim 10, wherein the shared memory segment selection technique includes at least one shared memory segment selection technique selected from the group consisting of: distributed Round-Robin algorithms, shared Round-Robin algorithms, processor identification algorithms, allocation length algorithms; and hashing algorithms.

12. The method of claim 1, wherein the plurality of memory segments include a plurality of shared memory segments of different sizes.

13. The method of claim 1, further comprising dynamically increasing and decreasing the number of shared memory segments.

14. The method of claim 1, further comprising dynamically merging and splitting a plurality of shared memory segments.

15. Computer or machine readable programs elements translatable for implementing the method of claim 1.

16. An apparatus, comprising the computer or machine readable programs elements of claim 15, wherein the apparatus comprises a processor.

17. An apparatus for performing the method of claim 1.

* * * * *